(12) United States Patent
Escofet Via

(10) Patent No.: US 11,043,111 B1
(45) Date of Patent: Jun. 22, 2021

(54) FIRE ALARM SYSTEM

(71) Applicant: Carrier Corporation, Palm Beach Gardens, FL (US)

(72) Inventor: Jordi Escofet Via, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/126,828

(22) Filed: Dec. 18, 2020

(30) Foreign Application Priority Data

Dec. 20, 2019 (EP) ..................................... 19383160

(51) Int. Cl.
*G08B 25/14* (2006.01)
*G08B 25/00* (2006.01)
*G08B 17/00* (2006.01)
*H04W 84/18* (2009.01)

(52) U.S. Cl.
CPC ............. *G08B 25/14* (2013.01); *G08B 17/00* (2013.01); *G08B 25/004* (2013.01); *H04W 84/18* (2013.01)

(58) Field of Classification Search
CPC ...... G08B 25/14; G08B 17/00; G08B 25/004; H04W 84/18
USPC ..................................................... 340/539.17
See application file for complete search history.

(56) References Cited

U.S. PATENT DOCUMENTS

| 8,552,857 | B2* | 10/2013 | Berezowski | ......... | G08B 25/009 |
| | | | | | 340/539.22 |
| 10,063,416 | B2 | 8/2018 | Berezowski et al. | | |
| 2011/0301770 | A1* | 12/2011 | Rutman | ................... | H04L 41/06 |
| | | | | | 700/292 |
| 2012/0163352 | A1* | 6/2012 | Bansal | ................... | G08B 25/10 |
| | | | | | 370/338 |
| 2013/0036796 | A1* | 2/2013 | Fleury, Jr. | ............... | G01M 3/00 |
| | | | | | 73/40.5 R |
| 2013/0336292 | A1* | 12/2013 | Kore | ...................... | G08B 17/10 |
| | | | | | 370/336 |

(Continued)

FOREIGN PATENT DOCUMENTS

DE 102014214344 A1 1/2016

OTHER PUBLICATIONS

European Search Report for Application No. 19383160.9; dated Jun. 8, 2020; 9 Pages.

*Primary Examiner* — Ojiako K Nwugo
(74) *Attorney, Agent, or Firm* — Cantor Colburn LLP

(57) ABSTRACT

A fire alarm includes comprises a central fire alarm control panel for monitoring the building and activating an alarm; and multiple remote units for distribution within the building, the remote units including indicating devices for determining conditions that are indicative of a possible emergency. The multiple remote units are in communication with the fire alarm control panel in a master-slave relationship such that the fire alarm control panel will receive inputs from the indicating devices and activate the alarm when those inputs indicate a possible emergency. In addition, the remote units include a secondary communication system for communication between remote units in a degraded mode of operation that occurs in the event of a failure of the master-slave communications with the fire alarm control panel, the secondary communication system including a transceiver arrangement at each remote unit for providing a wireless mesh network between the multiple remote units.

15 Claims, 1 Drawing Sheet

(56) References Cited

U.S. PATENT DOCUMENTS

| | | | |
|---|---|---|---|
| 2013/0342347 A1* | 12/2013 | Huseth | H04W 92/20 340/539.16 |
| 2014/0098802 A1* | 4/2014 | Prison | H04Q 9/00 370/338 |
| 2015/0163002 A1* | 6/2015 | Prison | H04J 3/0641 370/220 |
| 2015/0212965 A1 | 7/2015 | Kaestli et al. | |
| 2016/0127878 A1* | 5/2016 | Clarke | H04W 4/021 705/324 |
| 2017/0124854 A1* | 5/2017 | Otis | G08B 3/10 |
| 2017/0127301 A1* | 5/2017 | Sharma | H01B 11/04 |
| 2017/0228993 A1 | 8/2017 | Avak et al. | |
| 2018/0219724 A1 | 8/2018 | Krishnan et al. | |
| 2020/0019287 A1* | 1/2020 | Sahai | G06F 3/0484 |
| 2020/0380835 A1* | 12/2020 | Simpson | G08B 25/009 |

* cited by examiner

FIRE ALARM SYSTEM

FOREIGN PRIORITY

This application claims priority to European Patent Application No. 19383160.9, filed Dec. 20, 2019, and all the benefits accruing therefrom under 35 U.S.C. § 119, the contents of which in its entirety are herein incorporated by reference.

TECHNICAL FIELD

The present invention relates to a fire alarm system for a building, the fire alarm system comprising: a central fire alarm control panel for monitoring the building and activating an alarm; and multiple remote units for distribution within the building. The invention also relates to a method of operating such a fire alarm system.

BACKGROUND

Building fire alarm systems are used to identify risk of fires (and also in some cases other emergencies) and to alert occupants and/or authorities of such risks. In many cases there is a regulatory requirement for a fire alarm system to be in place, as well as further requirements on the nature of the system. Typical fire alarm systems include a fire alarm control panel connected to a number of indicating devices (e.g. smoke alarms, manual call points) and indicator devices (e.g. sirens, bells, lights, voice messages and so on). The fire alarm system can also include fire extinguishing devices that can be automatically triggered via the fire alarm control panel. There are hence a number of remote units distributed across the building, and connected via some form of a communications network to the fire alarm control panel. The fire alarm control panel receives inputs from the indicating devices and determines if an alarm should be sounded. In some cases the fire alarm control panel may determine specific actions for different zones of a building depending on the nature of the emergency and the inputs from indicating devices in each of those different zones. The fire alarm control panel may also be connected to a communication system, such as via a telephone network, for the purposes of remote monitoring of the building and/or for alerting authorities to the presence of a fire. Thus, for example, when a potential fire is detected then the fire alarm control panel may sound an alarm to trigger evacuation of the building, as well as automatically alerting the emergency services.

Known systems have communication between the fire alarm control panel and the remote units via a master-slave communication system. This may be a requirement for regulatory compliance and/or is often designed into new products to ensure compatibility with previously installed products, such that an upgraded fire alarm control panel may interface with existing remote units in a building, and to allow new remote units to operate correctly with pre-existing fire alarm control panels. The master-slave communication network may include wired links between the fire alarm control panel and the remote units, which can be involved in power supply as well as communications. A master interface at the fire alarm control panel can receive and broadcast information to the remote units.

SUMMARY

Viewed from a first aspect, the present invention provides a fire alarm system for a building, the fire alarm system comprising: a central fire alarm control panel for monitoring the building and activating an alarm; and multiple remote units for distribution within the building, the remote units including indicating devices for determining conditions that are indicative of a possible emergency; wherein the multiple remote units are in communication with the fire alarm control panel in a master-slave relationship such that the fire alarm control panel will receive inputs from the indicating devices and activate the alarm when those inputs indicate a possible emergency; and wherein the remote units comprise a secondary communication system for communication between remote units in a degraded mode of operation that occurs in the event of a failure of the master-slave communications with the fire alarm control panel, the secondary communication system comprising a transceiver arrangement at each remote unit for providing a wireless mesh network between the multiple remote units.

The fire alarm system of this aspect introduces a secondary communication network overlaid on the primary communication network, as provided by the master-slave system. Prior art systems using only the master-slave communication system are reliant on a single interface between the different devices, as well as being reliant on correct operation of the relevant parts of the fire alarm control panel. If a communication link is broken, or if the fire alarm control panel can no longer operate correctly as the master within the master-slave system, then the communication is lost. By introducing a secondary communication network allowing for a wireless mesh network between the remote units then the fire alarm system may be provided with a degraded mode of operation, where various fire alarm functions may still be provided even after a failure of the master-slave communication system. It will be appreciated that advantages arise when either some or all of the remote units in a fire alarm system have the transceiver arrangement allowing them to interact via the wireless mesh network. It is not essential that all the remote units have this capability, although it is beneficial. The fire alarm system may comprise a mixture of remote units with a transceiver arrangement as described herein, along with remote units (e.g. indicating or indicator units) without this secondary communication capability.

Moreover, the majority of existing protocols used for communication between remote units and the fire alarm control panel cannot support a broadcast communication. Existing fire alarm systems hence lack the availability to get information of each device at any point of the installation, e.g. to directly obtain information from a remote unit. By adding a transceiver arrangement at each remote unit, as proposed in the first aspect, a wireless mesh network capability can be added, providing a secondary communication capability that may be always available, either when the system enters a degraded mode (e.g. as triggered by failure of the master-slave system) or upon demand (e.g., for inspection, maintenance or installation purposes, enabling access to remote units when required by a user). The wireless mesh network may be provided as a secondary communication system for security and safety purposes, such as by providing redundancy as well as additional communication capabilities.

In installations where the master-slave system also provides power to the remote units, the present fire alarm system may be arranged so that the remote units are powered independently of the master-slave system. Thus, they may not rely on a "fire loop" for power or as the sole means of communication, and the wireless mesh network can be fully operative without the fire alarm control panel.

The possible emergency may be related to a fire, for example, but it will be appreciated that the fire alarm system may also be used for also other emergencies, such as non-fire emergencies requiring activation of an evacuation procedure.

The remote units include a number of indicating devices, which may be devices for sensing conditions or for receiving inputs from users. For example the indicating devices may include one or more of: manual call points; smoke detectors; heat detectors; other building sensors used for fire or heat detection, such as room thermostats; sensors for supervised doors; sensors for supervised fire extinguishers; water flow sensors; and so on. Input-output modules may be provided for handling information from some types of sensors that may lie outside of the fire system, such as thermostats or water flow sensors. Additionally or alternatively input-output modules may be provided for activating automatic door opening and/or closure systems, or door locking systems. The indicating devices may provide inputs for triggering an alarm condition of the fire alarm system.

The remote units may include indicator devices, which may be devices for indicating an alarm condition of the fire alarm system, such as audible or visible devices. The indicator devices may include one or more of: sirens; bells; speech sounders; other types of sounders; lights; beacons or remote indicators. The indicator devices may also include one or more transmitter devices for sending alarm notifications to users. Alarm notifications may be sent to local users, for example via wireless transmission of notifications to a mobile device, and/or may be sent to remote users such as building management authorities and/or emergency services.

The remote units may include fire suppression systems, which may include fire suppression devices that can be triggered by the fire alarm control panel and/or using the secondary communication system.

The remote units may include combined indicating and indicator devices, for example devices including detection capabilities along with an alarm, such as smoke detectors also including an audible alarm. Such remote units may include combinations of any of the functions discussed above in relation to the indicating and indicator devices.

The fire alarm control panel acts as the master in the master-slave relationship, with a master-slave communication system providing a primary means of communication for the fire alarm system. The correct operation of the fire alarm control panel may hence be a pre-requisite for the master-slave communication system. The master-slave communication system may be a wired and/or wireless network with wired and/or wireless connections between the fire alarm control panel and each of the remote units. Typically the master-slave communication system will not allow for any broadcast capability for the remote units, which cannot communicate with each other using the master-slave communication system.

It will be appreciated that failure of the fire alarm control panel, such as damage to an internal board, will result in a failure of the master-slave communications, with continued operation of the fire alarm system hence needing the degraded mode of operation with communication between the remote units using the secondary communication system. Alternatively, there may be a failure of the individual communication links for specific remote units, such as broken wiring, resulting in a loss of required communication pathways even whilst the fire alarm control panel remains operational.

The secondary communication system advantageously allows the remote units to communicate between each other in the event of a failure of the master-slave communications. This means that the fire alarm system may operate in a degraded mode with some functions remaining even without a functioning fire alarm control panel, or with a failure of one or more individual links. If the failure of the master-slave communications involves failures of one or more individual links with the fire alarm control panel remaining operational then with the degraded mode the secondary communication system may be used to provide communications replacing failed communication pathways between the remote units and the fire alarm control panel. If there is a failure of the fire alarm control panel then the secondary communication system may provide a communication network across all of the multiple remote units. In this case the remote units may be arranged such that alarms may be triggered locally or globally via basic logic at the remote units. For example, if one or more of the indicating devices determine conditions that are indicative of a possible emergency then one or more indicator devices may be operated, such as indicator devices in the same area of the building as the indicating devices that have indicated a possible emergency, or indicator devices for the whole building.

The secondary communication system comprises a transceiver arrangement at each remote unit, which may be any suitable transmitter and receiver device. The transmitter and receiver can be provided as separate hardware elements, or may be provided by a transceiver element with a combined transmitting and receiving capability, such as by using a single antenna for both transmitting and receiving. In example embodiments the secondary communication system is a Bluetooth network, such as a Bluetooth low energy (BLE) mesh network. This form of network does on rely on a central hub/router and thus can be formed simply via the remote units themselves, which may hence each be provided with a suitable Bluetooth transceiver.

The secondary communication system may be capable of communication with an external device, such as communication with computer device, including a mobile device such as a smartphone. It will be appreciated that if a Bluetooth network is used then this may be readily compatible with various computer devices, including smartphone devices. The fire alarm system may include an app for a computer device to enable users to interact with the fire alarm control panel and/or with the remote units, such as by using the secondary communication network for communication with the computer device.

The invention extends to a building incorporating the fire alarm system, with the remote units distributed within the building.

Viewed from a second aspect, the invention provides a method of operating a fire alarm system as in the first aspect, wherein the method comprises using the secondary communication system for communication between remote units in the event of a failure of the master-slave communications with the fire alarm control panel.

The method may be for operating a fire alarm system with any of the other features discussed above.

The secondary communication system may be used to provide a degraded mode of operation allowing at least some functions of the fire alarm system during a failure of the master-slave communications. If the failure of the master-slave communications involves failures of one or more individual links with the fire alarm control panel remaining operational then the secondary communication system may be used to provide communications replacing failed communication pathways between the remote units and the fire alarm control panel. If there is a failure of the fire alarm control panel then the secondary communication system may provide a communication network across all of the multiple remote units. In this case the method may include using the remote units such that alarms may be triggered locally or globally via basic logic at the remote units.

The method may include using the secondary communication system in response to user requirements, even when there has not been a failure of the master-slave communications. In some examples this may be done via communication with the user's smartphone, e.g. via a Bluetooth interface when the wireless mesh network uses Bluetooth. For example, the secondary communication system may be utilised using inspection, maintenance or installation, such as for calibration purposes with local communication between an installer and a remote unit.

BRIEF DESCRIPTION OF THE DRAWINGS

Certain embodiments of the disclosure will now be described by way of example only and with reference to the accompanying drawings in which.

DETAILED DESCRIPTION OF THE INVENTION

Figure 1:
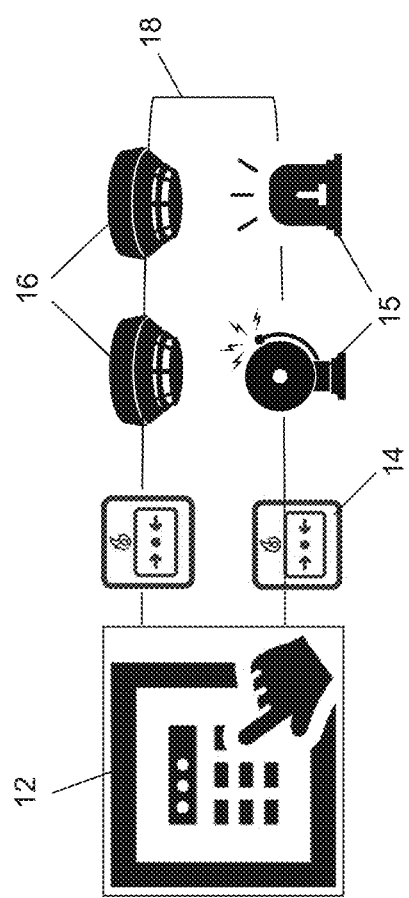
FIG. 1 is a diagram of a fire alarm system using a master-slave communication system.

As seen in FIG. 1 a fire alarm system includes a fire alarm control panel 12 in communication with multiple remote units 14, 15, 16 in the form of manual call points 14, alert devices 15 such as bells or lights, and smoke and/or fire alarms 16. The manual call points 14 (also known as trigger points) are a form of indicating device. The alert devices 15 are indicating devices used for alerting users to the existence of an alarm condition. The smoke and/or fire alarms 16 can function as combined indicating and indicator devices, having a detection capability along with an alarm, such as an audible alarm. The remote units 14, 15, 16 are joined to the fire alarm control panel 12 via a master-slave communication system 18, which can be a wired system for data communications as well as providing power to the remote units. A problem with such systems is that a failure of the master-slave communication system 18, such as a failure of an individual link thereof, or a failure of the fire alarm control panel 12, can lead to an inoperative fire alarm system.

Figure 2:
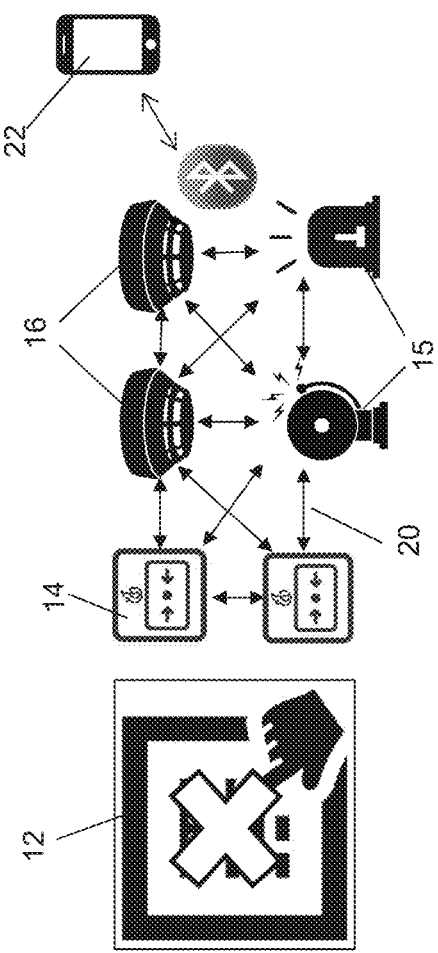
FIG. 2 shows a similar fire alarm system also provided with a secondary communication system using a wireless mesh network.

In FIG. 2 the fire alarm system is modified to address this problem via addition of a secondary communication system 20, which in this example is in the form of a Bluetooth mesh network. The secondary communication system 20 is overlaid on the primary communication network, as provided by the master-slave system 18. This gives advantages including those set out above, including the ability to operate in a degraded mode in the event of failure of the master-slave communications. The degraded mode of operation allows for various fire alarm functions to still be provided even after a failure of the master-slave communication system, as discussed above.

Various types of remote units 14, 15, 16 may be used in the fire alarm system, as is known in the art, such as devices functioning with one or more capabilities found in manual call points; smoke detectors; heat detectors; other building sensors used for fire or heat detection, such as room thermostats; sensors for supervised doors; sensors for supervised fire extinguishers; water flow sensors; sirens; bells; lights; transmitter devices and so on. The fire alarm system may include input-output modules for handling information from some types of indicating devices that may lie outside of the fire system, such as thermostats or water flow sensors. Additionally or alternatively input-output modules may be provided for activating automatic door opening and/or closure systems, or door locking systems. The remote units may also include fire suppression systems that can be triggered by the fire alarm system.

The secondary communication system 20 may enable communications with an external device 22, such as via a smartphone 22 as shown in FIG. 2, or via some other kind of computer device. This allows for a user to access the secondary communication system 20 upon demand, as well as during the degraded mode. For example, via the smartphone 22 an authorised user may perform maintenance, inspection and/or installation operations, as well as monitoring alarm events and/or controlling the fire alarm system.

What is claimed is:

1. A fire alarm system for a building, the fire alarm system comprising:
a central fire alarm control panel for monitoring the building and activating an alarm; and
multiple remote units for distribution within the building, the remote units including indicating devices for determining conditions that are indicative of a possible emergency;
wherein the multiple remote units are in communication with the fire alarm control panel in a master-slave relationship such that the fire alarm control panel will receive inputs from the indicating devices and activate the alarm when those inputs indicate a possible emergency; and
wherein the remote units comprise a secondary communication system for communication between remote units in a degraded mode of operation that occurs in the event of a failure of the master-slave communications with the fire alarm control panel, the secondary communication system comprising a transceiver arrangement at each remote unit for providing a wireless mesh network between the multiple remote units.

2. A fire alarm system as claimed in claim 1, wherein the secondary communication capability is available when the system enters the degraded mode and also upon demand when required by a user.

3. A fire alarm system as claimed in claim 1, wherein the indicating devices are configured to provide inputs for triggering an alarm condition of the fire alarm system and include devices for sensing conditions and/or for receiving inputs from users, the indicating devices including at least one of manual call points; smoke detectors; heat detectors; other building sensors used for fire or heat detection; sensors for supervised doors; sensors for supervised fire extinguishers; and water flow sensors.

4. A fire alarm system as claimed in claim 1, wherein the remote units include one or more indicator device(s), the indicator device(s) being for indicating an alarm condition of the fire alarm system.

5. A fire alarm system as claimed in claim 4, wherein the indicator device(s) include an audible or visible alert device.

6. A fire alarm system as claimed in claim 4, wherein the indicator device(s) include a transmitter device for sending alarm notifications to users.

7. A fire alarm system as claimed in claim 4, wherein the remote units may include one or more fire suppression system(s), including fire suppression device(s) that can be triggered by the fire alarm control panel and/or using the secondary communication system.

8. A fire alarm system as claimed in claim 1, wherein the fire alarm control panel acts as the master in the master-slave communications, which are a primary means of communication for the fire alarm system.

9. A fire alarm system as claimed in claim 1, wherein the secondary communication system is arranged to provide the wireless mesh network as a communication network across the multiple remote units in the event of failure of the fire alarm control panel, in order that in the degraded mode the fire alarm system can operate with some fire alarm functions even without a functioning fire alarm control panel.

10. A fire alarm system as claimed in claim 1, wherein the secondary communication system is arranged to provide communications replacing failed communication pathways between the remote units and the fire alarm control panel in the event of failure of one or more individual links between the remote units and the fire alarm control panel.

11. A fire alarm system as claimed in claim 1, wherein the remote units are arranged such that in the degraded mode of operation alarms may be triggered locally or globally via basic logic at the remote units.

12. A fire alarm system as claimed in claim 1, wherein the secondary communication system is a Bluetooth mesh network and the transceiver arrangements at the remote units comprise Bluetooth transceivers.

13. A fire alarm system as claimed in claim 1, wherein the secondary communication system is capable of enabling wireless communication between the remote devices and an external device.

14. A fire alarm system as claimed in claim 1, comprising an app for a computer device, such a for smartphones, to enable users to interact with the fire alarm control panel and/or with the remote units by using the secondary communication network for communication with the computer device.

15. A method of operating a fire alarm system as in claim 1, wherein the method comprises using the secondary communication system for communication between remote units in the event of a failure of the master-slave communications with the fire alarm control panel.

* * * * *